United States Patent [19]

Inoue

[11] 4,448,655
[45] May 15, 1984

[54] TRAVELING-WIRE ELECTROEROSION MACHINING ELECTRODE AND METHOD

[75] Inventor: Kiyoshi Inoue, Tokyo, Japan

[73] Assignee: Inoue-Japax Research Incorporated, Yokohama, Japan

[21] Appl. No.: 322,381

[22] Filed: Nov. 17, 1981

[51] Int. Cl.³ .................. B23P 1/10; B23P 1/12; B23K 9/16

[52] U.S. Cl. .................. 204/129.1; 204/129.35; 204/129.46; 204/206; 204/224 M; 204/225; 204/280; 204/290 R; 219/69 W; 219/69 M; 51/410; 156/664; 72/703; 427/34; 427/117

[58] Field of Search ........... 204/129.1, 129.46, 224 M, 204/225, 206, 280, 290 R; 219/69 W, 69 E, 69 M; 29/DIG. 23; 72/703; 51/410, 417, 426; 427/34, 443, 1, 117, 437, 304, 305; 156/656, 156, 664, 630, 634

[56] References Cited

U.S. PATENT DOCUMENTS

| | | | |
|---|---|---|---|
| 2,883,306 | 4/1959 | Cotter | 51/410 X |
| 2,945,936 | 7/1960 | Carman | 219/69 E |
| 3,163,058 | 12/1964 | Hunter | 72/703 X |
| 3,896,010 | 7/1975 | Vetter | 204/206 X |
| 4,193,852 | 3/1980 | Inoue | 204/129.46 |
| 4,341,939 | 7/1982 | Briffod et al. | 219/69 E X |

FOREIGN PATENT DOCUMENTS 830917 3/1960 United Kingdom .
689807 10/1979 U.S.S.R. .................. 204/224 M Primary Examiner—Donald R. Valentine
Attorney, Agent, or Firm—Karl F. Ross; Herbert Dubno

[57] ABSTRACT

An improved electrode and method for electroerosion machining both of traveling-wire type wherein an elongate element having a thickness of 0.05 to 0.5 mm is axially displaced to form a traveling-wire machining electrode therefrom. The traveling-wire machining electrode is juxtaposed with a workpiece across a machining gap flooded with a machining liquid issuing from a jet and a machining current from a source is passed between the electrode and the workpiece to electroerosively machine the latter. Gaseous bubbles formed by the electrical decomposition of the machining liquid tend to be adherent on the machining surface of the electrode and thus act as a thermal insulator between the electrode and the coolant machining liquid. The elongated element is formed with a rugged peripheral surface along a length thereof to facilitate the detachment of the gaseous bubbles from the machining surface of the electrode. Various ways of producing the rugged peripheral surface are described, e.g. by forming projections and recesses in a regular pattern on a cylindrical wire surface; twisting together a group of small diameter wires; winding a small diameter wire on a large diameter core wire; and forming a spiral groove in the smooth surface of a wire by means of a rotating die.

29 Claims, 11 Drawing Figures

TRAVELING-WIRE ELECTROEROSION MACHINING ELECTRODE AND METHOD

FIELD OF THE INVENTION

The present invention relates to an improved traveling-wire machining electrode as well as an improved method of electroerosively machining a conductive workpiece with the traveling-wire electrode of a novel configuration.

The term "electroerosive machining" or "electroerosion" is used herein to refer to a process of electrical machining in general, including electrical discharge machining (EDM) in which a workpiece material is removed by the action of successive electrical discharges, electrochemical machining (ECM) in which the workpiece is machined by electrolytic solubilization of the material and electrochemical-discharge machining (ECDM) in which the material removal is effected by a combination of the actions of electrical discharges and electrolytic metal solubilization.

BACKGROUND OF THE INVENTION

In the traveling-wire electroerosion process, a continuous electrode wire is axially transported by a wire axial drive means from a supply means to a takeup means. In the path of wire travel, a pair of machining guide members may be disposed at opposite sides of an electrically conductive workpiece to stretch or span the traveling electrode wire linearly thereacross to traverse the workpiece, thus positioning the electrode wire in a precise machining relationship with the workpiece. An electrical machining current, typically or preferably in the form of a succession of time-spaced electrical pulses, is applied between the traveling electrode wire and the workpiece across a machining gap flooded with a machining liquid, e.g. an aqueous liquid of dielectric nature or low conductivity, or an aqueous solution of electrolyte, to electroerosively remove material from the workpiece. As the material removal proceeds, the workpiece is displaced transversely to the longitudinal axis or the straight line path of the traveling wire electrode along a prescribed two-dimensional machining feed path under the command, advantageously, of a numerical controller, so that a desired contour of machining is generated in the workpiece.

It is important that the wire electrode be of good conductivity and composed to afford a satisfactory rate of material removal and to be subject to minimal erosive wear. It is desirable that the wire electrode be heat-resistant and retain sufficient tensile strength at a high temperature created by the passage of a machining current of high amperage or current density, and be thus free from breakage in operation. Customarily, the wire electrode is constituted as a single wire having a diameter of 0.05 to 0.5 mm and composed of copper metal or a copper alloy such as brass. Such a wire has been provided by drawing through a die and naturally has had a circular cross section and a smooth peripheral surface.

The machining liquid is supplied, typically from one or more nozzles, into the machining gap to serve on one hand as a gap medium to carry the discharge and/or electrolytic current and on the other hand as a coolant to dissipate heat developed by the passage of the machining current of high amperage or current density required. Higher amperage or current density is desirable to achieve greater removal rate and efficiency, and necessitates renewal of the machining liquid in the gap at a higher rate.

It has, however, been found that the continued supply of the machining liquid in an ample amount towards the machining gap often causes wire breakage and does not allow the use of a greater machining current. When the electrode wire is excessively heated or insufficiently cooled, it tends to break. There is thus a limitation in the heat-dissipation ability of the conventional electrode wire having a smooth and round peripheral surface along its length traversing the machining gap. With the conventional electrode wire having a smooth machining surface, it has also be observed that gases produced by discharges and/or electrolytic decomposition of the delivered machining liquid tend to be adherent on the electrode surface and separate the latter from the coolant liquid and thus to act as a thermal insulator therebetween, and further to allow gaseous discharges essentially of thermal natural to develope thereacross.

OBJECTS OF THE INVENTION

It is, accordingly, an important object of the present invention to provide a traveling-wire electroerosive machining electrode of novel configuration which has a greater heat-emission capability than the conventional electrode wire configuration.

Another important object of the present invention is to provide an improved electroerosion-machining method of traveling-wire type which affords greater machining efficiency than the prior art.

Other and specific objects of the invention will become apparent as the description thereof which follows proceeds.

SUMMARY OF THE INVENTION

In accordance with the present invention there is provided, in a first aspect thereof, a traveling-wire electroerosion-machining electrode which consists of an elongated element having a thickness or diameter of 0.05 to 0.5 mm, preferably not less than 0.1 mm, and formed with a rugged peripheral surface along a length thereof or its peripheral surface having surface projections and recesses formed on the said surface and arranged in a predetermined uniform pattern. The projections or recesses should have a height or depth one fiftieth to one third, preferably one thirtieth to one fifth and more preferably one tenth to one fifth, of the thickness of the elongated element, or in the range preferably between 5 and 20 microns.

The rugged peripheral surface may be produced by constituting the elongated element with a plurality of conductive wires twisted together, or interlaced or braided to provide a predetermined uniform pattern of surface projections and recesses. An essentially equivalent rugged peripheral electrode surface may be produced by twisting one or more relatively thin conductive wires on a relatively thick conductive wire or on a bundle of thin conductive wires, or by covering a relatively thick conductive wire or an bundle of thin wires with a weave of relatively thin conductive wires.

The rugged peripheral surface may alternatively be produced by forming projections and recesses on a conventional traveling-wire machining electrode wire by means of a mechanical, electrochemical or thermal technique or any combination thereof. The mechanical forming technique includes sandblasting and knurling. Sandblasting may make use of grit having a mesh size of 10 to 500. In knurling, the recess diameter is determined by the size and number per unit area of the projections on the knurling tool. A rotary die may also be used to mechanically form a rugged peripheral surface on the conventional electrode wire by drawing the latter through the die. Chemical forming includes electroless plating and etching while electrochemical forming includes electroplating and electroetching. Thermal forming may be practiced by plasma-spraying of fine metallic powder particles. Powder atomizing may also be used to provide a rugged peripheral surface on the conventional electrode wire by applying atomized powder particles thereon.

Specifically, the invention provides an improved traveling-wire machining electrode, i.e. an improved electrode for use in a traveling-wire electroerosion machining apparatus or method of the kind wherein (a) an elongated elment having a thickness of 0.05 to 0.5 mm, preferably in excess of 0.09 mm, is displaced along a predetermined path to form a traveling-wire machining electrode juxtaposed with a workpiece across a machining gap flooded with a machining liquid, (b) an electrical machining current is applied between the electrode and the workpiece to electroerosively remove material form the workpiece, thereby machining the latter, (c) the said path of the electrode and the workpiece are relatively displaced to form a machined contour in the workpiece, and (d) gaseous bubbles are formed by the decomposition of the machining liquid as the machining current is passed through the gap and tend to adhere on the machining surface of the electrode and thus act as a thermal insulator between the latter and the machining liquid, characterized in that in order to facilitate detachment of the said gaseous bubbles from the machining surface, the said elongated element is formed with a rugged peripheral surface along a length thereof having projections and recesses arranged in a predetermined uniform pattern, the projections or recesses having a height or depth one fiftieth to one thid, preferably on thirtieth to one fifth and more preferably one tenth to one fifth, of the thickness of the elongated element, or in the range of 5 to 20 microns.

The invention provides, in a second aspect thereof, an improved method of electroerosively machining an electrically conductive workpiece with a traveling-wire machining electrode, which method comprises the steps of: (a) preparing an elongated element having a thickness ranging between 0.05 and 0.5 mm, preferably upwards of 0.09 mm; (b) axially displacing the elongated element along a predetermined path to form the traveling-wire machining electrode therefrom and juxtaposing the workpiece with the traveling-wire machining electrode across a machining gap; (c) supplying a machining liquid into the machining gap; (d) applying a machining current between the electrode and the workpiece through the machining gap to electroerosively remove material from the workpiece, thereby machining the latter while permitting gaseous bubbles to be formed in the gap by electrical decomposition of the machining liquid and to tend to be adherent on the machining surface of the electrode whereby to act as a thermal insulator between the machining surface and the machining liquid; (e) relatively displacing the said path of the electrode and the workpiece to form a machined contour therein; and (f) promoting detachment of the said gaseous bubbles from the said machining surface by forming the said elongated element with a rugged peripheral surface along a length thereof traversing the workpiece.

The rugged peripheral surface is here characterized by surface projections and recesses arranged in a predetermined uniform pattern, the projections or recesses having a height or depth one fiftieth to one third, preferably one thirtieth to one fifth and more preferably one tenth to one fifth, of the thickness of the said elongated element.

Such a rugged peripheral surface favorable to the purposes of the present invention is produced by constituting the elongated element with a plurality of conductive wires twisted together, or woven or braided. An essentially equivalent rugged peripheral electrode surface may be produced by twisting one or more relatively thin conductive wires on a relatively thick conductive wires or in a spiral format, or on a bundle of thin conductive wires, or by covering a relatively thick conductive wire or a bundle or twist of relatively thin wires with a weave of relatively thin conductive wires to form a predetermined uniform pattern of the surface projections and recesses.

A favorable rugged peripheral surface may also be provided by forming the projections and recesses on a conventional smooth traveling-wire machining electrode wire by utilizing a mechanical, chemical, electrochemical or thermal forming technique as already described.

By virtue of a novel configuration as described, it has been observed that the machining surface of the traveling-wire machining electrode is allowed to cool rapidly and efficiently, thus permitting a machining current of greater amperage or current density to be employed without the danger of destruction of the wire electrode while maintaining machining stability. The eventual result is a marked increase in removal rate and machining efficiency. It has also been found that the use of a novel wire-electrode configuration as described to promote thermal emission is further enhanced when, in aforesaid step (b) of the method, the elongated element is displaced along a said predetermined path from the upper side to the lower side of the workpiece.

BRIEF DESCRIPTION OF THE DRAWING

These and other features and advantages of the present invention will become more readily apparent from the following description taken with reference to the accompanying diagrammatic drawing in which.

SPECIFIC DESCRIPTION

Figure 1:
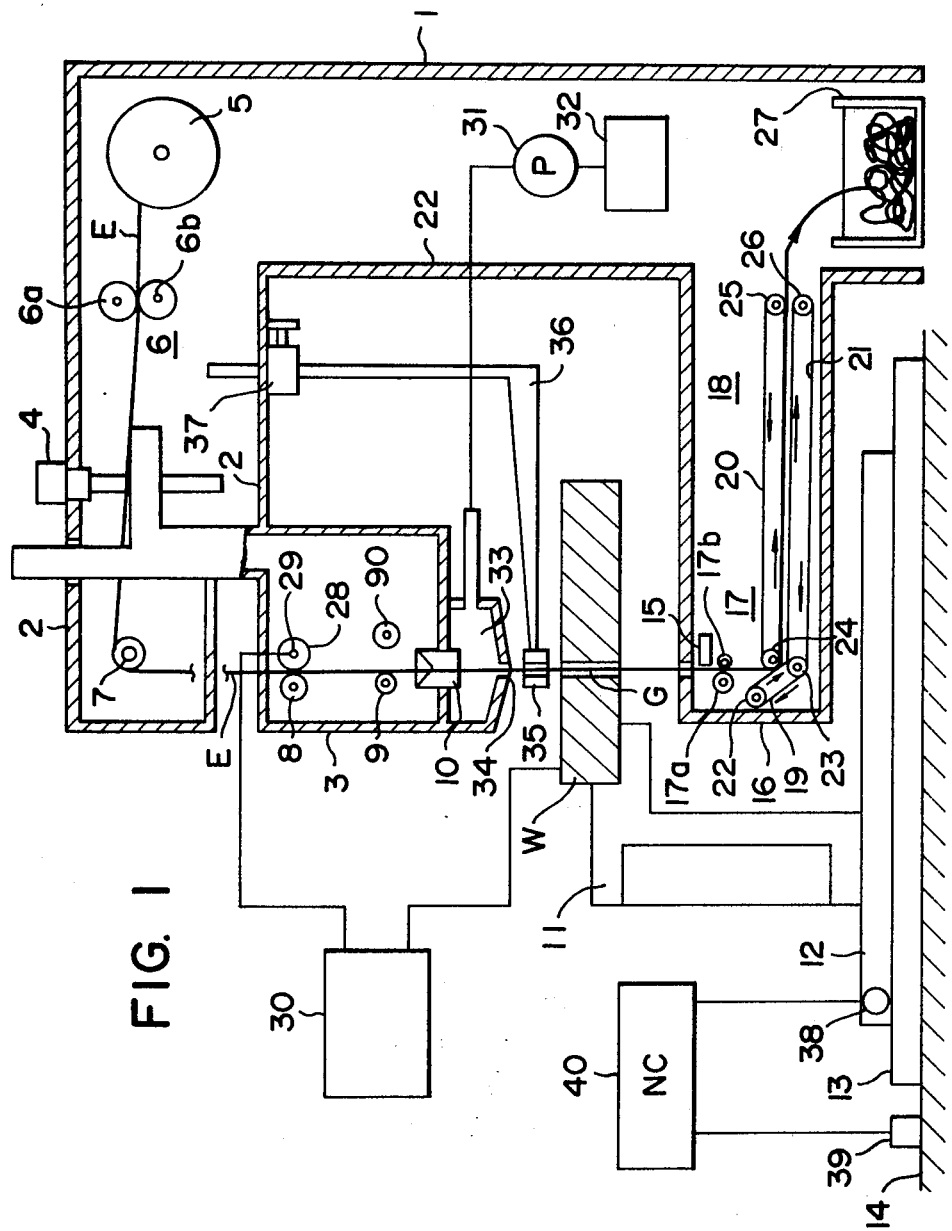
FIG. 1 is an elevational view, essentially in section, diagrammatically illustrating a typical traveling-wire electroerosion machining apparatus with which the improved machining wire electrode and method according to the invention may be practiced.

Referring now to FIG. 1, a traveling-wire electroerosion machine of typical design is shown comprising a vertical column 1 formed with an upper horizontal extension 2. A machine head 3 is slidably carried by the horizontal extension 2, and is vertically displaceable by a motor 4 for adjustment of its vertical position. A traveling-wire machining electrode E which is here constructed of any one of the novel elongated elements shown in FIGS. 2–10 or a modification thereof and having a thickness 0.05 to 0.5 mm, preferably 0.09 to 0.5 mm is stored in a supply reel 5 mounted at an upper site in the column 1, and is guided via brake rollers 6a, 6b and a guide roller 7 in the horizontal extension 2 and then via rollers 8, 9 and a die guide 10 in the head 3 towards the region of a workpiece W, which is securely mounted on a work stand or table 11. The latter is carried on a cross-slide table arrangement 12, 13 which is in turn carried on a base 14 of the machine. The wire electrode E is positioned in a machining relationship with the workpiece W by and between the die guide 10 located on the upper side of the workpiece in the head 3 and a slide guide 15 located on the lower side of the workpiece in a hollow arm 16 which extends horizontally from the vertical column 1 beneath the workpiece W. A wire drive unit 17 is disposed below the slide gude 15 within the hollow arm 16, and is constituted as a pair of abutting rollers 17a and 17b one of which is driven by a motor (not shown) to give a continuous traction to the wire electrode E. Further shown arranged in the arm 16 is a wire pull-out system 18 comprising three endless belts 19, 20 and 21 wound on pairs of rollers: 22 and 23; 24 and 25; and 23 and 26, respectively. In this arrangement, the rollers 23 and 24 may be driven by a motor or motors (not shown) to move these belts and to seize the wire electrode E first between the moving belts 19 and 20 and then between the moving belts 20 and 21. The wire electrode E emerging from between the moving belts 20 and 21 is collected in a collection box 27.

Against the traction force exerted on the wire electrode E by the drive rollers 17a and 17b downstream of the workpiece W, the brake rollers 6a and 6b on the wire supply side are driven so as to apply an appropriate braking force to the wire electrode E so that the latter continuously travels from the supply side (5) to the collection side (27) at an appropriate rate of axial travel and under an appropriate tension. The guide roller 7 and the pull-out unit 18 serve to change the direction of wire travel from the supply side to the workpiece W and from the latter to the collection side 27, respectively. Downstream of the direction-changing guide roller 7, an electrically conductive roller 28 is disposed in an abutting relationship with the guide roller 8 to conduct the electroerosion current to the wire electrode E and is thus connected via a brush 29 to one output terminal of an electroerosion power supply 30 which has its other output terminal electrically connected to the workpiece W via a conducting block (not shown). The electroerosion current is thus passed through the machining gap G formed between the wire electrode E and the workpiece W and flushed with a machining liquid. A pump 31 draws the machining liquid from a reservoir 32 to furnish it to a plenum chamber 33 attached to the head 3 and dependent from its lower end and formed with a liquid delivery opening 34. The machining liquid pumped into the chamber 33 is delivered through the opening 34 onto the traveling wire electrode E and carried into the machining gap G therewith. A tubular electromechanical transducer 35 may be disposed so as to allow the wire electrode E to pass therethrough. When energized by a power supply (not shown), this transducer imparts a high-frequency mechanical vibration to the traveling wire electrode E so as to facilitate an electroeosion process. The transducer 35 is shown as supported on an L-shaped arm 36 suspended from the outer wall of the horizontal extension 2, and its vertical position is adjusted by a position adjustment unit 37.

The cross tables 12 and 13 carrying the work stand 11 are driven in an X-Y plane, by means of an X-axis motor 38 and a Y-axis motor 39 drivingly coupled therewith, respectively. The motor 38 and 39 are energized with X-axis and Y-axis drive signals furnished from a numerical-control (NC) unit 40 to displace the workpiece W relative to the longitudinal axis of the wire electrode E to establish a given relative machining-start position preprogrammed in the NC unit 40 and then to displace the workpiece W relative to the axis of the traveling wire electrode E along a prescribed cutting path also preprogrammed in the NC unit 40.

Figure 2:
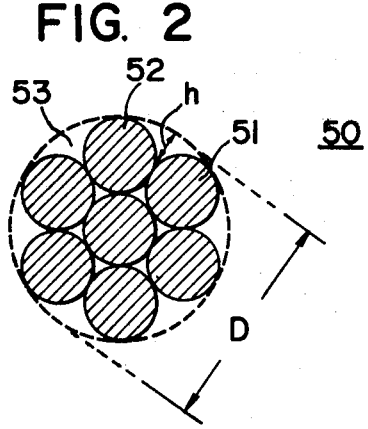
FIG. 2 is a cross-sectional view of an elongated element embodying the present invention in the form of a twisted or woven strand or formed by twisting or weaving seven relatively thin conductive wires together.

In accordance with this invention, the wire electrode E may advantageously take the form of an elongated element consisting of a plurality of thin wires twisted or woven together. FIG. 2 shows a cross section of seven such wires 51 which constitute an elongated element 50 of the invention. It is seen that the improved elongated element is formed with a rugged peripheral surface having projections 52 and recesses 53. In accordance with the invention, it has been found that the projections 52 or recesses 53 should have a height or depth h one fiftieth to one third, preferably one thirtieth to one fifth and more preferably one tenth of one fifth, of the thickness D of the elongated element 50. The projections or recesses should have a height or depth preferably in the range between 5 and 15 microns.

It is seen that the improved elongated element 50 having a given cross-sectional area or a thickness D has a surface area much greater than that of a conventional traveling-wire electroerosion machining electrode wire which is circular in cross section that has the same cross-sectional area and even greater than that of the circular cross-sectional wire having the same thickness D. The improved elongated element 50 thus presents greater heat emission surface. In addition, advantageously the outer recesses 53 and inner recesses 54 both provide pockets for the machining liquid which serves as a coolant on one hand and as a machining medium on the other thus permitting the electrode surfaces to be cooled with increased efficiency and enabling delivery of the machining liquid into the machining gap with consistency and without fail. Since the elongated element 50 constituting the wire electrode E is axially displaced, there is provided a moving cylindrical machining surface having spirally formed third passages thereon which add the advantage of promoting delivery of the machining liquid into the narrow machining gap.

Furthermore, it has been found that the unique structure of the elongated element of the invention effectively removes the thermal barrier produced by gaseous bubbles which consecutively develop on the electrode surface as a result of the decomposition of the machining liquid by machining discharge and/or electrolysis. The rugged superficial formations on the moving elongated element of the invention have been found to facilitate detachment from the electrode surface of these gaseous bubbles which act as a thermal insulator between the surface and the machining liquid, thus further promoting the thermal emission and cooling of the electrode surface. With the cooling effect so enhanced, the elongated element is capable of carrying greater machining current without undergoing thermal destruction by the heat which develops by the passage of the greater current. The eventual result is a marked increase in removal rate and hence marked shortening of the total machining time required to accomplish a given machining operation.

A further advantage of the twisted and woven structure of the elongated element according to the invention is that it is greater in strength, yet retaining wire flexibility, than the conventional single-wire structure. Any accidental breakage of one or another of the elementary wires constituting the traveling-wire machining electrode due to a possible arc discharge does not lead to destruction of the electrode itself.

Figure 4:
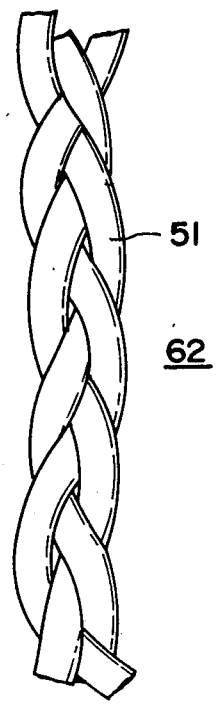
FIG. 4 is a side view of a woven or interlaced wire element according to the invention.
Figure 3:
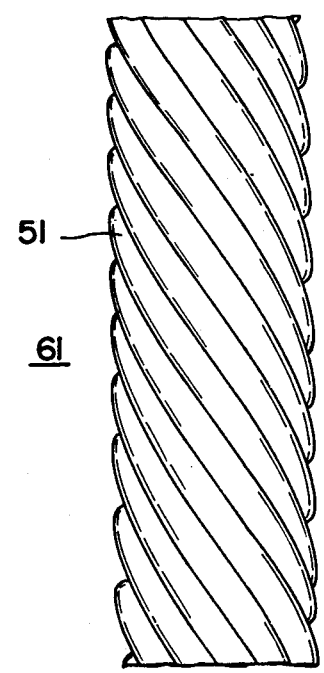
FIG. 3 is a side view of a twisted wire element according to the invention.

Typical elongated elements of twisted and woven wire structures are shown in FIGS. 3 and 4 designated at 61 and 62, respectively. The twisted wire electrode 61 shown consists of seven elementary wires 51 while the woven wire electrode 62 of FIG. 4 is shown as consisting of three elementary wires 51. In general, each elementary wire 51 may have a diameter of 0.01 to 0.03 mm.

The thickness of the elongated element comprising a twisted or woven wire structure may be subject to change in a wide range with the tension varied and thus can be adjusted simply by adjusting the tension applied thereto. This advantageously eliminates the need to alter the electrode elements for different machining shapes or configuration as has been essential with the prior art.

It will be understood that various modifications are possible in the twisted or woven wire structure according to the invention. For example, a relatively thick core wire may be produced having a weave or twist of relatively thin wires thereon. The core wire may be replaced by a bundle of wires or twisted wires.

The rugged peripheral surface of the elongated element according to the invention may also be produced by mechanically, chemically, electrochemically or thermally forming projections and/or recesses in a predetermined uniform pattern on the electrode element.

Figure 5:
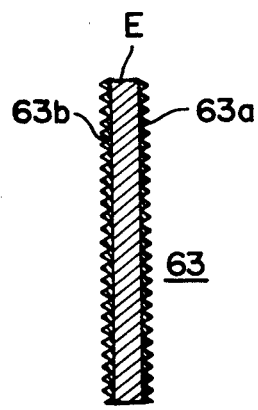
FIG. 5 is a side view of a wire element of the invention formed with a rugged peripheral surface having projections and recesses arranged in a certain predetermined uniform pattern and produced mechanically, chemically, electrochemically or thermally.
Figure 6:
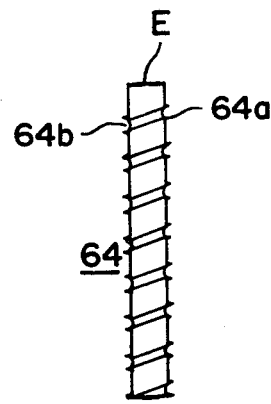
FIG. 6 is a side view of a wire element of the invention formed with a rugged peripheral surface produced by means of a rotary die.
Figure 7:
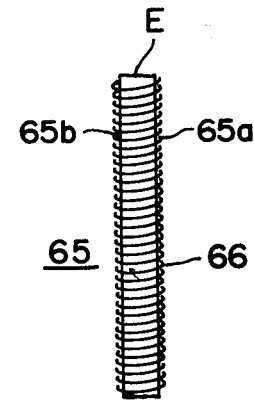
FIG. 7 is side view of a wire element of the invention comprising a core wire and a thinner wire spirally wound thereon.

FIG. 5 shows an elongated element 63 consisting of an electrode wire E having projections 63a and recess 63b which may be formed thereon by electroless plating, chemical plating, electroplating, spark deposition, powder spraying, sintering or knurling. FIG. 6 shows another elongated element 64 consisting of an electrode wire E drawn through a rotary die to present ridges or projections 64a and grooves or recesses 64b thereon. FIG. 7 shows a further form 65 of the elongated element which consists of a relatively thick electrode wire E having a relatively thin wire 66 spirally wound thereon to present projections 65a and recesses 65b. The projections 63a, 64a, 65a or recesses 63b, 64b, 65b should have a height or depth one fiftieth to one third, preferably one thirtieth to one fifth and more preferably one tenth to one fifth, of the thickness of the electrode wire E. Preferably the height or depth should range between 5 to 15 microns in general.

Here again, the unique structure of the elongated element of the invention effectively removes the thermal barrier produced by gaseous bubbles which progressively develops on the electrode surface as a result of the electrolytic and/or discharge decomposition of the machining liquid. The rugged formations 63a, 63b; 64a, 64b; 65a, 65b on the moving electrode E facilitate detachment from the electrode surface of these gaseous bubbles which act as a thermal insulator between the surface and machining liquid, thus promoting the thermal emission and cooling of the electrode surface.

Figure 9:
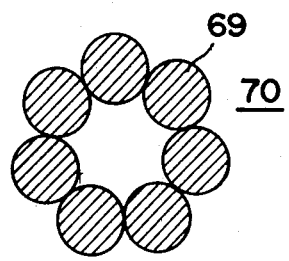
FIG. 9 is a cross-sectional view of a wire element of the invention comprising seven wires twisted together without a core wire.
Figure 10:
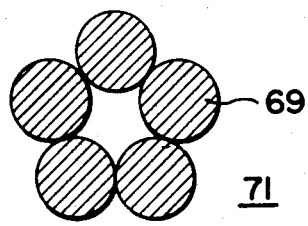
FIG. 10 is a cross-sectional view of a wire element of the invention comprising five wires twisted together.
Figure 8:
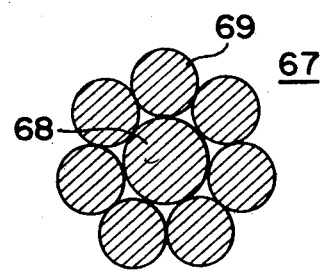
FIG. 8 is a cross-sectional view of a wire element of the invention comprising a core wire and seven wires wound or twisted thereon.

FIG. 8 shows an elongated element 67 consisting of a core wire 68 and seven wires 69 twisted thereon while FIG. 9 shows an elongated element 70 devoid of a core wire and formed seven wires 69 twisted together. FIG. 10 shows an elongated element 71 formed of five wire 69 twisted together without a core wire.

EXAMPLE

A wire element 67 of FIG. 8 consists of a core wire of a diameter of 0.1 mm and seven wound wires each having a diameter of 0.065 mm and is designated as E1. A wire element 70 of FIG. 9 consists of seven wires each having a diameter of 0.075 mm and is designated as E2. A wire element 71 of FIG. 10 consists of five wires each having a diameter of 0.09 mm and is designated as E3. Wire elements E1–E3 all have the same cross-sectional area of 0.0314 mm$^2$. A wire element 63 of FIG. 5 consisting of a wire having a diameter of 0.2 mm and formed with peripheral surface projections 63a uniformly having a height of 13 microns is designated as E4. A wire element 64 of FIG. 6 consists of a wire having a diameter of 0.2 mm and drawn through a rotary die to provide ridges 64a having a height of 10 microns and grooves 64b having a depth of 15 microns and is designated as E5. A conventional wire element consisting of a simple wire having a diameter of 0.2 mm is designated as E0.

Figure 11:
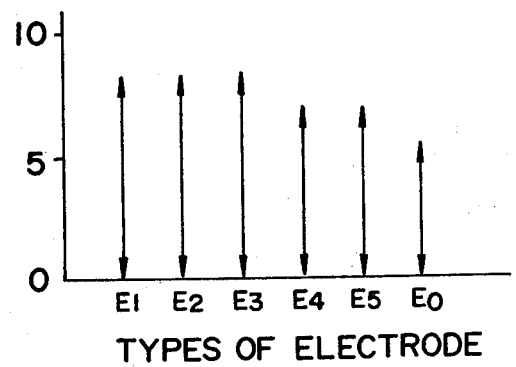
FIG. 11 is a graph showing maximum machining currents which can be applied without causing electrode destruction for various electrode elements of the invention and of the prior art.

The highest machining current which can be passed through each of these wire elements without causing its destruction is measured in the electroerosion machining of S55C (Japanese Industrial Standard) steel material using a machining liquid composed of a water liquid having a specific resistance of $2 \times 10^4$ ohm-cm and is shown in the bar chart of FIG. 11. It is shown that all of the wire elements E1–E5 according to the invention are much superior to the conventional wire element E0 and exhibit much better cooling capability. For example, the wire element E3 has a heat emission capability of $4.6 \times 10^4$ Kcal/m$^2$.h.°C. and the wire element E4 is of $4.6 \times 10^4$ Kcal/m$^2$.h.°C. These values are both much higher than $3 \times 10^3$ Kcal/m$^2$.h.°C. of the conventional simple electrode wire. It has also be noted in this connection that it is desirable to displace the wire element downwards through the workpiece in the traveling-wire electroerosion machining operations, as shown in FIG. 1.

What is claimed is:

1. A traveling-wire electroerosion-machining electrode consisting of an elongated element having a thickness of 0.05 to 0.5 mm and formed with a rugged peripheral surface along a length thereof, which surface incorporates features intended when the electrode is in use in an electroerosion apparatus or method to facilitate the detachment from the machining surface of the electrode element of gaseous bubbles produced by decomposition of a machining liquid by a machining current, said surface features comprising projections and recesses formed on said surface and arranged in a predetermined uniform pattern, said projections and recesses having a size measured radially in a transverse cross-section of the electrode ranging from one fifth to one third of the thickness of said elongated element, said rugged peripheral surface being a surface of the contour of said elongated element produced by twisting a plurality of wires together.

2. A traveling-wire electroerosion-machining electrode consisting of an elongated element having a thickness of 0.05 to 0.5 mm and formed with a rugged peripheral surface along a length thereof, which surface incorporates features intended when the electrode is in use in an electroerosion apparatus or method to facilitate the detachment from the machining surface of the electrode element of gaseous bubbles produced by decomposition of a machining liquid by a machining current, said surface features comprising projections and recesses formed on said surface and arranged in a predetermined uniform pattern, said projections and recesses having a size measured radially in a transverse cross-section of the electrode ranging from one fifth to one third of the thickness of said elongated element, said rugged peripheral surface being a surface of the contour of said elongated element produced by weaving a plurality of wires together.

3. A traveling-wire electroerosion-machining electrode consisting of an elongated element having a thickness of 0.05 to 0.5 mm and formed with a rugged peripheral surface along a length thereof, which surface incorporates features intended when the electrode is in use in an electroerosion apparatus or method to facilitate the detachment from the machining surface of the electrode element of gaseous bubbles produced by decomposition of a machining liquid by a machining current, said surface features comprising projections and recesses formed on said surface and arranged in a predetermined uniform pattern, said projections and recesses having a size measured radially in a transverse cross-section of the electrode ranging from one fifth to one third of the thickness of said elongated element, said rugged peripheral surface being a surface of the contour of said elongated element produced by winding at least one relatively thin wire on a relatively thick wire.

4. An electrode for use in a traveling-wire electroerosion machining apparatus or method of the kind wherein (a) a continuous, elongated element having a thickness of 0.1 to 0.5 mm and traversing a workpiece is continuously displaced therethrough along a predetermined path between a pair of guide members to form a traveling-wire machining electrode juxtaposed with the workpiece across a machining gap flooded with a machining liquid, (b) an electrical machining current is applied between the electrode and the workpiece to electroerosively remove material from the workpiece, thereby machining the latter, (c) said path and said workpiece are relatively displaced transversely to said path to form a machined contour in said workpiece, and (d) gaseous bubbles formed by the decomposition of said machining liquid as said machining current is passed through said gap tend to adhere on a machining surface of said electrode adjacent to said workpiece, said elongated element being formed by providing it with a rugged peripheral surface along a length thereof comprising a multiplicity of spaced projections of an electrically conductive material added in a predetermined uniform, discrete pattern on said elongated element for the purpose of facilitating detachment of said gaseous bubbles from said machining surface of said electrode, said projections having a height ranging from one tenth to one third of the thickness of said elongated element.

5. A method of electroerosively machining an electrically conductive workpiece with a traveling-wire machining electrode, comprising the steps of:

(a) preparing a continuous, elongated element having a thickness ranging between 0.1 and 0.5 mm and being formed with a rugged peripheral surface along a length thereof;

(b) axially displacing said elongated element continuously through a workpiece along a predetermined path to form a traveling-wire machining electrode juxtaposed with said workpiece across a machining gap;

(c) supplying a machining liquid to said gap;

(d) passing a machining current between said electrode and said workpiece through said machining gap to electroerosively remove material from said workpiece, thereby machining the latter while causing gaseous bubbles to be formed in the gap by electrical decomposition of said machining liquid which bubbles tend to be adherent on the machining surface of said electrode and thus act as a thermal insulator between said machining surface and said machining liquid;

(e) relatively displacing said path and said workpiece transversely to form a machined contour in the latter; and (f) promoting detachment of said gaseous bubbles from said machining surface by forming said elongated element with said rugged peripheral surface acting to facilitate detachment of said gaseous bubbles from said machining surface of said electrode element, said rugged peripheral surface comprising a multiplicity of spaced projections of an electrically conductive material added in a predetermined uniform, discrete pattern on said elongate element, said projections having a height ranging between one tenth and one third of the thickness of said elongate element.

6. The method defined in claim 5 wherein said material is non-abrasive.

7. A method of electroerosively machining an electrically conductive workpiece with a traveling-wire machining electrode, comprising the steps of:

(a) preparing an elongated element having a thickness ranging between 0.05 and 0.5 mm;
(b) axially displacing said elongated element along a predetermined path to form a traveling-wire machining electrode juxtaposed with said workpiece across a machining gap;
(c) supplying a machining liquid to said gap;
(d) passing a machining current between said electrode and said workpiece through said machining gap to electroerosively remove material from said workpiece, thereby machining the latter while permitting gaseous bubbles to be formed in the gap by electrical decomposition of said machining liquid which bubbles tend to be adherent on the machining surface of said electrode and thus act as a thermal insulator between said machining surface and said machining liquid;
(e) relatively displacing said path and said workpiece to form a machined contour in the latter; and
(f) promoting detachment of said gaseous bubbles from said machining surface by forming said elongated element with a rugged peripheral surface acting to facilitate detachment of said gaseous bubbles from said machining surface, said elongated element being prepared by twisting a plurality of wires and thereby formed with said rugged peripheral surface.

8. A method of electroerosively machining an electrically conductive workpiece with a traveling-wire machining electrode, comprising the steps of:
(a) preparing an elongated element having a thickness ranging between 0.05 and 0.5 mm;
(b) axially displacing said elongated element along a predetermined path to form a traveling-wire machining electrode juxtaposed with said workpiece across a machining gap;
(c) supplying a machining liquid to said gap;
(d) passing a machining current between said electrode and said workpiece through said machining gap to electroerosively remove material from said workpiece, thereby machining the latter while permitting gaseous bubbles to be formed in the gap by electrical decomposition and said machining liquid which bubbles tend to be adherent on the machining surface of said electrode and thus act as a thermal insulator between said machining surface and said machining liquid;
(e) relatively displacing said path and said workpiece to form a machined contour in the latter; and
(f) promoting detachment of said gaseous bubbles from said machining surface by forming said elongated element with a rugged peripheral surface acting to facilitate detachment of said gaseous bubbles from said machining surface, said elongated element being prepared by weaving a plurality of wires and thereby formed with said rugged peripheral surface.

9. A method of electroerosively machining an electrically conductive workpiece with a traveling-wire machining electrode, comprising the steps of:
(a) preparing an elongated element having a thickness ranging between 0.05 and 0.5 mm;
(b) axially displacing said elongated element along a predetermined path to form a traveling-wire machining electrode juxtaposed with said workpiece across a machining gap;
(c) supplying a machining liquid to said gap;
(d) passing a machining current between said electrode and said workpiece through said machining gap to electoerosively remove material from said workpiece, thereby machining the latter while permitting gaseous bubbles to be formed in the gap by electrical decomposition of said machining liquid which bubbles tend to be adherent on the machining surface of said electrode and thus act as a thermal insulator between said machining surface and said machining liquid;
(e) relatively displacing said path and said workpiece to form a machined contour in the latter; and
(f) promoting detachment of said gaseous bubbles from said machining surface by forming said elongated element with a rugged peripheral surface acting to facilitate detachment of said gaseous bubbles from said machining surface, said elongated element being formed of a wire having a diameter of 0.05 to 0.5 mm, said rugged peripheral surface being produced by forming on the surface of said wire a multiplicity of projections and recesses arranged in a predetermined uniform pattern by means of chemical etching.

10. A method of electroerosively machining an electrically conductive workpiece with a traveling-wire machining electrode, comprising the steps of:
(a) preparing an elongated element having a thickness ranging between 0.05 and 0.5 mm;
(b) axially displacing said elongated element along a predetermined path to form a traveling-wire machining electrode juxtaposed with said workpiece across a machining gap;
(c) supplying a machining liquid to said gap;
(d) passing a machining current between said electrode and said workpiece through said machining gap to electroerosively remove material from said workpiece, thereby machining the latter while permitting gaseous bubbles to be formed in the gap by electrical decomposition of said machining liquid which bubbles tend to be adherent on the machining surface of said electrode and thus act as a thermal insulator between said machining surface and said machining liquid;
(e) relatively displacing said path and said workpiece to form a machined contour in the latter; and
(f) promoting detachment of said gseous bubbles from said machining surface by forming said elongated element with a rugged peripheral surface acting to facilitate detachment of said gaseous bubbles from said machining surface, said elongated element being formed of a wire having a diameter of 0.05 to 0.5 mm, said rugged peripheral surface being produced by forming on the surface of said wire a multiplicity of projections and recesses arranged in a predetermined uniform pattern by means of electrochemical etching.

11. A method of electroerosively machining an electrically conductive workpiece with a traveling-wire machining electrode, comprising the steps of:
(a) preparing an elongated element having a thickness ranging between 0.05 and 0.5 mm;
(b) axially displacing said elongated element along a predetermined path to form a traveling-wire machining electrode juxtaposed with said workpiece across a machining gap;
(c) supplying a machining liquid to said gap;
(d) passing a machining current between said electrode and said workpiece through said machining gap to electroerosively remove material from said workpiece, thereby machining the latter while permitting gaseous bubbles to be formed in the gap by electrical decomposition of said machining liquid which bubbles tend to be adherent on the machining surface of the electrode and thus act as a thermal insulator between said machining surface and said machining liquid;

(e) relatively displacing said path and said workpiece to form a machined contour in the latter; and (f) promoting detachment of said gaseous bubbles from said machining surface by forming said elongated element with a rugged peripheral surface acting to facilitate detachment of said gaseous bubbles from said machining surface, said elongated element being formed of a wire having a diameter of 0.05 to 0.5 mm, said rugged peripheral surface being produced by forming on the surface of said wire a multiplicity of projections and recesses arranged in a predetermined uniform pattern by means of sandblasting.

12. A method of electroerosively machining an electrically conductive workpiece with a traveling-wire machining electrode, comprising the steps of:

(a) preparing an elongated element having a thickness ranging between 0.05 and 0.5 mm;

(b) axially displacing said elongated element along a predetermined path to form a traveling-wire machining electrode juxtaposed with said workpiece across a machining gap;

(c) supplying a machining liquid to said gap;

(d) passing a machining current between said electrode and said workpiece through said machining gap to electroerosively remove material from said workpiece, thereby machining the latter while permitting gaseous bubbles to be formed in the gap by electrical decomposition of said machining liquid which bubbles tend to be adherent on the machining surface of said electrode and thus act as a thermal insulator between said machining surface and said machining liquid;

(e) relatively displacing said path aand said workpiece to form a machined contour in the latter; and (f) promoting detachment of said gaseous bubbles from said machining surface by forming said elongated element with a rugged peripheral surface acting to facilitate detachment of said gaseous bubbles from said machining surface, said elongated element being formed of a wire having a diameter of 0.05 to 0.5 mm, said rugged peripheral surface being produced by forming on the surface of said wire a multiplicity of projections and recesses arranged in a predetermined uniform pattern by means of knurling.

13. A method of electroerosively machining an electrically conductive workpiece with a traveling-wire machining electrode, comprising the steps of:

(a) preparing an elongated element having a thickness ranging between 0.05 and 0.5 mm;

(b) axially displacing said elongated element along a predetermined path to form a traveling-wire machining electrode juxtaposed with said workpiece across a machining gap;

(c) supplying a machining liquid to said gap;

(d) passing a machining current between said electrode and said workpiece through said machining gap to electroerosively remove material from said workpiece, thereby machining the latter while permitting gaseous bubbles to be formed in the gap by electrical decomposition of said machining liquid which bubbles tend to be adherent on the machining surface of said electrode and thus act as a thermal insulator between said machining surface and said machining liquid;

(e) relatively displacing said path and said workpiece to form a machined contour in the latter; and (f) promoting detachment of said gaseous bubbles from said machining surface by forming said elongated element with a rugged peripheral surface acting to facilitate detachment of said gaseous bubbles from said machining surface, said elongated element being formed of a wire having a diameter of 0.05 to 0.5 mm, said rugged peripheral surface being produced by forming on the surface of said wire a multiplicity of projections and recesses arranged in a predetermined uniform pattern by means of power-spraying with plasma.

14. A method of electroerosively machining an electrically conductive workpiece with a traveling-wire machining electrode, comprising the steps of:

(a) preparing an elongated element having a thickness ranging between 0.05 and 0.5 mm;

(b) axially displacing said elongated element along a predetermined path to form a traveling-wire machining electrode juxtaposed with said workpiece across a machining gap;

(c) supplying a machining liquid to said gap;

(d) passing a machining current between said electrode and said workpiece through said machining gap to electroerosively remove material from said workpiece, thereby machining the latter while permitting gaseous bubbles to be formed in the gap by electrical decomposition of said machining liquid which bubbles tend to be adherent on the machining surface of said electrode and thus act as a thermal insulator between said machining surface and said machining liquid;

(e) relatively displacing said path and said workpiece to form a machined contour in the latter; and (f) promoting detachment of said gaseous bubbles from said machining surface by forming said elongated element with a rugged peripheral surface acting to facilitate detachment of said gaseous bubbles from said machining surface, said elongated element being formed of a wire having a diameter of 0.05 to 0.5 mm, said rugged peripheral surface being produced by forming on the surface of said wire a multiplicity of projections and recesses arranged in a predetermined ujiform pattern by means of power-atomizing.

15. A method of electroerosively machining an electrically conductive workpiece with a traveling-wire machining electrode, comprising the steps of:

(a) preparing an elongated element having a thickness ranging between 0.05 and 0.5 mm;

(b) axially displacing said elongated element along a predetermined path to form a traveling-wire machining electrode juxtaposed with said workpiece across a machining gap;

(c) supplying a machining liquid to said gap;

(d) passing a machining current between said electrode and said workpiece through said machining gap to electroerosively remove material from said workpiece, thereby machining the latter while permitting gaseous bubbles to be formed in the gap by electrical decomposition of said machining liquid which bubbles tend to be adherent on the machining surface of said electrode and thus act as a thermal insulator between said machining surface and said machining liquid;

(e) relatively displacing said path and said workpiece to form a machined contour in the latter; and (f) promoting detachment of said gaseous bubbles from said machining surface by forming said elongated element with a rugged peripheral surface acting to facilitate detachment of said gaseous bubbles from said machining surface, said elongated element being formed of a wire having a diameter of 0.05 to 0.5 mm, said rugged peripheral surface being produced by forming on the surface of said wire a multiplicity of projections and recesses arranged in a predetermined uniform pattern by means of sintering.

16. A method of electroerosively machining an electrically conductive workpiece with a traveling-wire machining electrode, comprising the steps of:

(a) preparing an elongated element having a thickness ranging between 0.05 and 0.5 mm;

(b) axially displacing said elongated element along a predetermined path to form a traveling-wire machining electrode juxtaposed with said workpiece across a machining gap;

(c) supplying a machining liquid to said gap;

(d) passing a machining current between said electrode and said workpiece through said machining gap to electroerosively remove material from said workpiece, thereby machining the latter while permitting gaseous bubbles to be formed in the gap by electrical decomposition of said machining liquid which bubbles tend to be adherent on the machining surface of said electrode and thus act as a thermal insulator between said machining surface and said machining liquid;

(e) relatively displacing said path and said workpiece to form a machined contour in the latter; and (f) promoting detachment of said gaseous bubbles from said machining surface by forming said elongated element with a rugged peripheral surface acting to facilitate detachment of said gaseous bubbles from said machining surface, said elongated element being formed of a wire having a diameter of 0.05 to 0.5 mm, said rugged peripheral surface being produced by forming on the surface of said wire a multiplicity of projections and recesses arranged in a predetermined uniform pattern by means of drawing said wire through a rotary die to prepare said elongated element.

17. A continuous, traveling-wire electroerosion-machining electrode adapted to traverse a workpiece and continuously to displace therethrough along a predetermined path defined between a pair of guide members while the workpiece is displaced transversely relative to said path to form a machined contour in the workpiece in an electroerosion method, said electrode consisting of an elongated element having a thickness of 0.1 to 0.5 mm and formed with a rugged peripheral surface along a length thereof, which surface incorporate features acting, when the electrode is in use in the method, to facilitate the detachment from the machining surface of the electrode element of gaseous bubbles produced by decomposition of a machining liquid by a machining current, said surface features comprising a multiplicity of spaced projections of an electrically conductive material formed on said surface in a predetermined, discrete uniform pattern, said projections having a height measured radially in a transverse cross-section of the electrode ranging from one tenth to one third of the thickness of said elongated element.

18. The electrode defined in claim 4 or claim 17 wherein said material is non-abrasive.

19. A continuous, traveling-wire electroerosion-machining electrode adapted to traverse a workpiece and continuously to displace therethrough along a predetermined path defined between a pair of guide members while the workpiece is displaced transversely relative to said path to form a machined contour in the workpiece, said electrode consisting of an elongated element formed with a rugged peripheral surface along a length thereof, said rugged peripheral surface being a surface of the contour of said elongated element produced by twisting a plurality of wires together.

20. A continuous, traveling-wire electroerosion-machining electrode adapted to traverse a workpiece and continuously to displace therethrough along a predetermined path defined between a pair of guide members while the workpiece is displaced transversely relative to said path to form a machined contour in the workpiece, said electrode consisting of an elongated element formed with a rugged peripheral surface along a length thereof, said rugged peripheral surface being a surface of the contour of said elongated element produced by weaving a plurality of wires together.

21. A continuous, traveling-wire electroerosion-machining electrode adapted to traverse a workpiece and continuously to displace therethrough along a predetermined path defined between a pair of guide members while the workpiece is displaced transversely relative to said path to form a machined contour in the workpiece, said electrode consisting of an elongated element formed with a rugged peripheral surface along a length thereof, said rugged peripheral surface being a surface of the contour of said elongated element produced by winding at least one relatively thin wire on a relatively thick wire.

22. A continuous, traveling-wire electroerosion-machining electrode adapted to traverse a workpiece and continuously to displace therethrough along a predetermined path defined between a pair of guide members while the workpiece is displaced transversely relative to said path to form a machined contour in the workpiece, said electrode consisting of an elongated element constituted by a wire having a thickness of 0.1 to 0.5 mm and formed with a rugged peripheral surface along a length thereof, said rugged peripheral surface being a surface of the contour of said elongated element produced by forming on the surface of said wire a multiplicity of projections and recesses which are produced by chemical etching.

23. A continuous, traveling-wire electroerosion-machining electrode adapted to traverse a workpiece and continuously to displace therethrough along a predetermined path defined between a pair of guide members while the workpiece is displaced transversely relative to said path to form a machined contour in the workpiece, said electrode consisting of an elongated element constituted by a wire having a thickness of 0.1 to 0.5 mm and formed with a rugged peripheral surface along a length thereof, said rugged peripheral surface being a surface of the contour of said elongated element produced by forming on the surface of said wire a multiplicity of projections and recesses which are produced by electrochemical etching.

24. A continuous, traveling-wire electroerosion-machining electrode adapted to traverse a workpiece and continuously to displace therethrough along a predetermined path defined between a pair of guide members while the workpiece is displaced transversely relative to said path to form a machined contour in the workpiece, said electrode consisting of an elongated element constituted by a wire having a thickness of 0.1 to 0.5 mm and formed with a rugged peripheral surface along a length thereof, said rugged peripheral surface being a surface of the contour of said elongated element produced by forming on the surface of said wire a multiplicity of projections and recesses which are produced by sandblasting.

25. A continuous, traveling-wire electroerosion-machining electrode adapted to traverse a workpiece and continuously to displace therethrough along a predetermined path defined between a pair of guide members while the workpiece is displaced transversely relative to said path to form a machined contour in the workpiece, said electrode consisting of an elongated element constituted by a wire having a thickness of 0.1 to 0.5 mm and formed with a rugged peripheral surface along a length thereof, said rugged peripheral surface being a surface of the contour of said elongated element produced by forming on the surface of said wire a multiplicity of projections and recesses which are produced by knurling.

26. A continuous, traveling-wire electroerosion-machining electrode adapted to traverse a workpiece and continously to displace therethrough along a predetermined path defined between a pair of guide members while the workpiece is displaced transversely relative to said path to form a machined contour in the workpeice, said electrode consisting of an elongated element constituted by a wire having a thickness of 0.1 to 0.5 mm and formed with a rugged peripheral surface along a length thereof, said rugged peripheral surface being a surface of the contour of said elongated element produced by forming on the surface of said wire a multiplicity of projections and recesses which are produced by power-spraying with plasma.

27. A continuous, traveling-wire electroerosion-machining electrode adapted to traverse a workpiece and continuously to displace therethrough along a predetermined path defined between a pair of guide members while the workpiece is displaced transversely relative to said path to form a machined contour in the workpiece, said electrode consisting of an elongated element constituted by a wire having a thickness of 0.1 to 0.5 mm formed with a rugged peripheral surface along a length thereof, said rugged peripheral surface being a surface of the contour of said elongated element produced by forming on the surface of said wire a multiplicity of projections and recesses which are produced by power-atomizing.

28. A continuous, traveling-wire electroerosion-machining electrode adapted to traverse a workpiece and continuously to displace therethrough along a predetermined path defined between a pair of guide members while the workpiece is displaced transversely relative to said path to form a machined contour in the workpiece, said electrode consisting of an elongated element constituted by a wire having a thickness of 0.1 to 0.5 mm formed with a rugged peripheral surface along a length thereof, said rugged peripheral surface being a surface of the contour of said elongated element produced by forming on the surface of said wire a multiplicity of projections and recesses which are produced by sintering.

29. A continuous, traveling-wire electroerosion-machining electrode adapted to traverse a workpiece and continuously to displace therethrough along a predetermined path defined between a pair of guide members while the workpiece is displaced transversely relative to said path to form a machined contour in the workpiece, said electrode consisting of an elongated element constituted by a wire having a thickness of 0.1 to 0.5 mm and formed with a rugged peripheral surface along a length thereof, said rugged peripheral surface being a surface of the contour of said elongated element produced by forming on the surface of said wire a multiplicity of projections and recesses which are produced by drawing said wire through a rotary die to prepare said elongated element.

* * * * *